June 9, 1959 W. A. MOORE 2,889,739
STEREOSCOPIC VIEWING SYSTEM
Filed May 3, 1954 3 Sheets-Sheet 1

INVENTOR.
WILLIAM A. MOORE
BY D. Gordon Angus
ATTORNEY

June 9, 1959  W. A. MOORE  2,889,739
STEREOSCOPIC VIEWING SYSTEM
Filed May 3, 1954  3 Sheets-Sheet 2
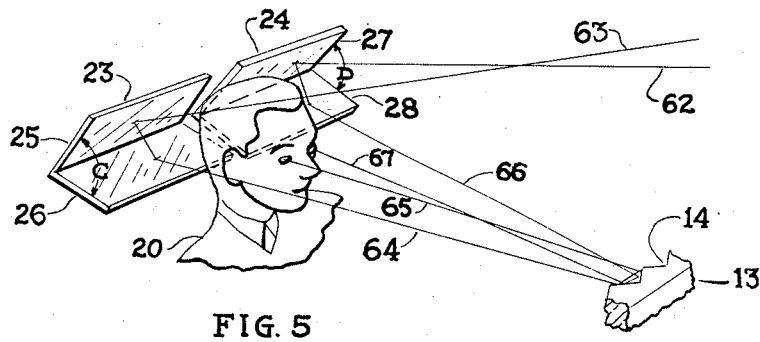
FIG. 5
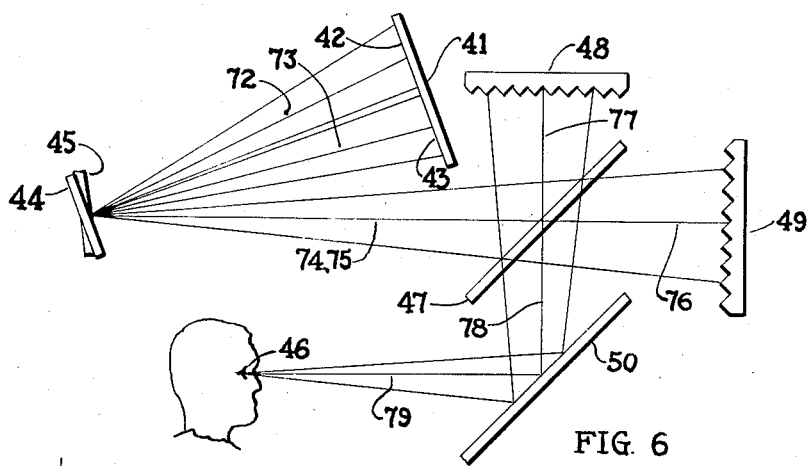
FIG. 6
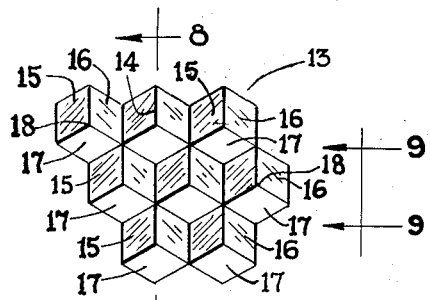
FIG. 7
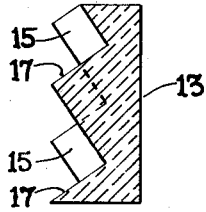
FIG. 8
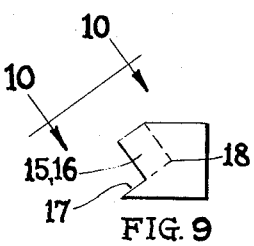
FIG. 9
FIG. 10
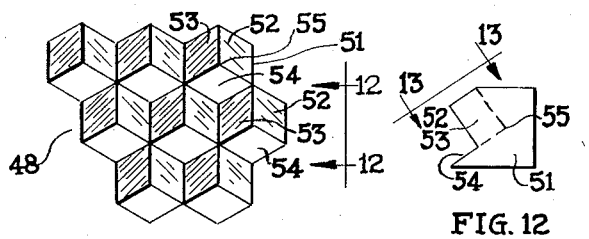
FIG. 11
FIG. 12
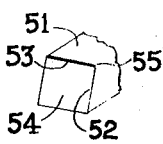
FIG. 13
INVENTOR
WILLIAM A. MOORE
BY D. Gordon Angus
ATTORNEY

INVENTOR
WILLIAM A. MOORE

United States Patent Office 2,889,739
Patented June 9, 1959

2,889,739

STEREOSCOPIC VIEWING SYSTEM

William A. Moore, Pacific Palisades, Calif., assignor of three-eighths to Kenneth B. Thompson, Sierra Madre, and one-fourth to D. Gordon Angus, San Marino, Calif.

Application May 3, 1954, Serial No. 427,008

2 Claims. (Cl. 88—16.6)

This invention pertains to projection of a stereoscopic image pairs, and to an opitcal system for viewing them which provides a stereoscopic effect.

An object of this invention is to provide an optical system in which an image pair may be projected and viewed so as to give a stereoscopic effect without fitting the observer himself with special devices such as glasses. A related object is to provide such means which can be adapted to existing theaters at a comparatively modest cost.

A feature of the instant invention resides in the projection of each image of a steroscopic image pair on a separate area of an opaque screen, which opaque screen is not meant to be seen directly by the observer. Then "splitter" mirrors near each observer cast reflections of the individual opaque screen images toward retrodirective reflecting means ahead of the observer. These retrodirective reflecting means may be such as a screen having a plurality of retrodirective reflectors thereon. The retrodirective reflecting means reflects the rays of the individual images so that each image from the opaque screen is perceived by a different eye of the observer, giving a stereoscopic effect.

An optional feature resides in the provision of a partial mirror and a totally reflective mirror in the optical path between the splitter mirrors and the retrodirective reflective means in the above system. These mirrors permit the use of a retrodirective reflecting screen whose construction has fewer dimensional restraints than other types of retrodirective reflecting screens.

These and other features of this invention will be fully understood from the following detailed description and the accompanying drawings, of which:

Fig. 5 is a perspective view of an alternate type of splitter mirror;

Fig. 6 is a side elevation of an optical system incorporating an optional form of the invention;

Fig. 7 is a fragmentary plan view of a retrodirective reflecting screen for use with the optical system of Figs. 1 and 14;

Fig. 8 is a side view taken at line 8—8 of Fig. 7;

Fig. 9 is a side view of an individual retrodirective reflector at line 9—9 of Fig. 8;

Fig. 10 is an end view taken at line 10—10 of Fig. 9;

Fig. 11 is a plan view of a retrodirective reflecting screen for use with the optical systems of Figs. 6 and 15;

Fig. 12 is a side view of an individual retrodirective reflector taken at line 12—12 of Fig. 11;

Fig. 13 is an end view taken at line 13—13 of Fig. 12;

Figure 1:
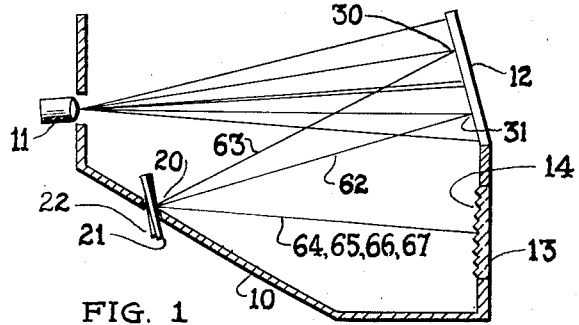
Fig. 1 is a side elevation of a theater showing an optical system in accordance with the present invention, and illustrating an optical path by which the images reach an observer.

Referring more particularly to the drawings, Fig. 1 shows a theater adapted to use the preferred form of the present invention. The audience is seated on an incline 10 so that a number of people may see past each other. A projector 11 is disposed at the upper rear of the theater so as to project images toward the front. This projector is preferably equipped with a stereo "nozzle," or pair of lenses (not shown) which projects a stereo pair as separate images. An opaque conventional projection screen 12 is placed at the upper front of the theater to receive the luminous images 30, 31 from the projector, which are separately projected, one above the other. They could as well be projected side by side, but in either case they will be projected on completely separate areas, and do not overlap each other. This opaque screen may lean out toward the audience.

A retrodirective reflecting screen 13 stands substantially vertically at the lower front end of the theater. This screen is studded with many small declivities or retrodirective reflectors 14. Such declivities are shown in detail in Figs. 7–10.

Each individual declivity or retrodirective reflector 14 has three intersecting reflecting surfaces or sides 15, 16, 17, the three surfaces meeting at an apex 18 which is the deepest part of the declivity. Surfaces 15 and 16 are each perpendicular to surface 17, but make an ablique angle with each other. This angle is preferably between 90° and 95°. When the screen is installed, the edges between surfaces 15 and 16 of all the declivities will lie in substantially parallel planes, which planes are preferably vertical. The surface is preferably entirely covered by these declivities. The regular mosaic pattern shown in Fig. 7 is an acceptable way of accomplishing such a result.

In a theater installation, the closest observer will probably not be closer to the screen than about 50 feet. The aperture of each individual reflector 14 will be of the order of .005–.030". Therefore the drawings are exaggerated in certain dimensions for purposes of illustration.

Figure 2:
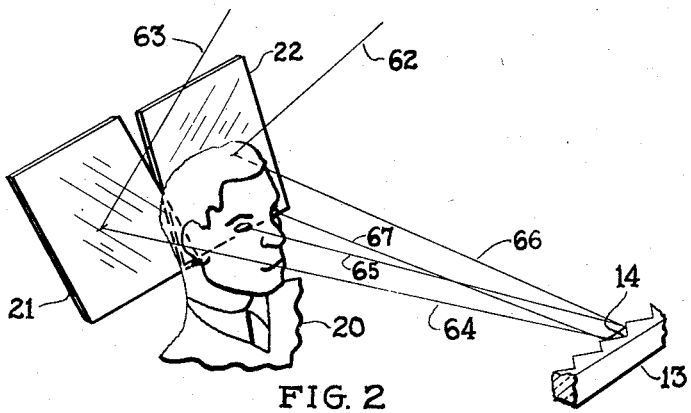
Fig. 2 is a perspective view showing the relationship between an observer and a pair of splitter mirrors.
Figure 3:
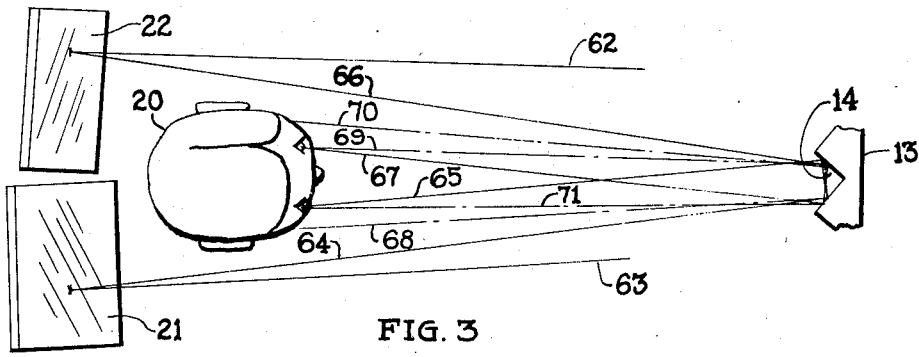
Fig. 3 is a plan of the perspective view shown in Fig. 2.
Figure 4:
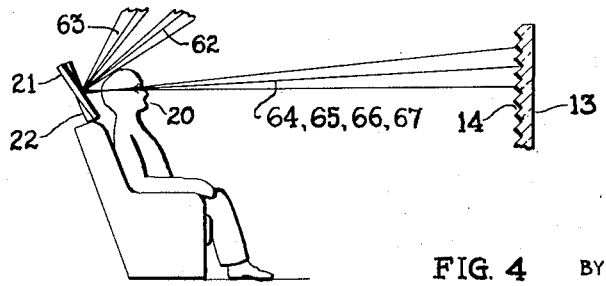
Fig. 4 is a schematic side elevation of the perspective view shown in Fig. 2.

An observer 20 on the incline 10 is chosen at random for purposes of illustration. Figs. 2–4 illustrates the apparatus at the seat of this observer. Similar apparatus is also provided at the seat of every other member of the audience. A pair of "splitter" mirrors 21, 22 is disposed, one mirror on each side of and slightly behind the observer's head. These mirrors are tilted at different angles, so that each reflects a different one of the images 30, 31 of the image pair from the opaque screen to the retrodirective reflecting screen 13, in front of the observer. Only one projector and one opaque screen are needed, since the splitter mirrors are variously tilted to reflect the images for the individual members of the audience.

Therefore the optical system will be similar for every member of the audience, although each individual will perceive rays which traveled on a different optical path.

Fig. 5 illustrates an alternate type of splitter mirror which may be used in place of mirrors 21, 22. These alternate splitter mirrors 23, 24 are each formed of two intersecting plane mirrors. Splitter mirror 23 is formed by the intersection of mirrors 25, 26 at a dihedral angle C, and splitter mirror 24 by mirrors 27, 28 which form a dihedral angle C. The considerations which determine the size of angles C and D will be discussed below.

Figure 14:
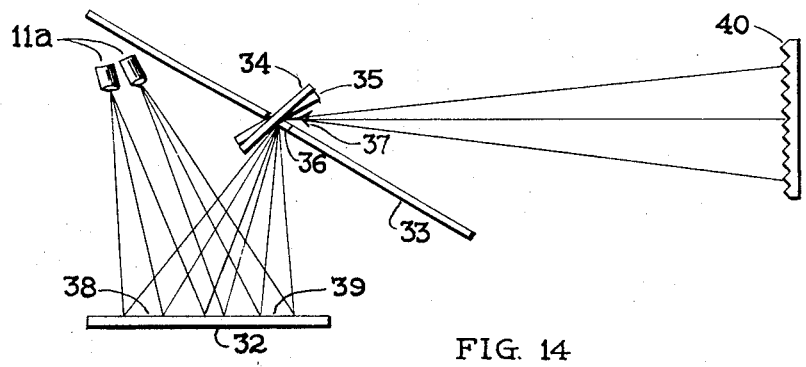
Fig. 14 is a schematic elevation of another optional embodiment of an optical system according to this invention.

Fig. 14 shows an alternate arrangement of the elements of the optical system of Fig. 1 wherein the images of an image pair are projected downward from a stereoprojector 11a onto an opaque screen 32 under the floor 33 of the theater. Splitter mirrors 34, 35 are located above an opening 36 in the floor, and by an observer 37. The mirrors are tilted so that each will reflect an individual one of the images 38, 39 from the opaque screen 32 to a retrodirective reflecting screen 40. This screen 40 is similar in every respect to screen 13 (Fig. 1).

Fig. 6 shows an alternate optical system incorporating the invention. An opaque screen 41 receives two separate images 42, 43 from a projector as described above. Two plane mirrors 44, 45 are provided for each observer 46. They are placed above and behind the observer, so that each will cast a reflection of a single member of the image pair from the opaque screen 41 to a partial mirror 47. This partial mirror is of a type which transmits part and reflects part of the light incident upon it. Such a mirror is commonly made by applying a thin coating of lead sulfide and magnesium fluoride crystals to one side of a transparent plate of glass.

A retrodirective reflecting screen 48 is disposed above the partial mirror with its reflecting surface facing it. As an optional feature, another retrodirective reflecting screen 49, may be placed on a line from the observer through the partial mirror on the opposite side of the partial mirror from the observer with its reflecting surface facing the partial mirror. Either one of screens 48 or 49 may be used alone, or both may be used at the same time. A totally reflecting mirror 50 is placed so as to reflect light rays from the partial mirror to the observer. In this system, one pair of splitter mirrors 44, 45 will be provided for each member of the audience. The splitter mirrors 23, 24 of Fig. 5 may be used in place of plane mirrors 44, 45 if preferred. Only one set of opaque and retrodirective reflecting screens, and one partial mirror and one totally reflecting mirror is needed to serve the entire audience.

A retrodirective reflecting screen 48 for the optical system of Fig. 6 is shown in detail in Figs. 11–13. The screen comprises a surface having a number of closely spaced small declivities or retrodirective reflectors 51. Each individual reflector has three mutually perpendicular reflecting sides or surfaces 52, 53, 54 which may be silvered or given some other reflective coating.

These three intersecting surfaces meet to form an apex 55. The apex is the deepest part of the declivity. These declivities may be disposed in a random fashion over the surface of this screen 48, and this screen therefore has fewer dimensional restraints than the screen 13 of Fig. 1. The aperture of each reflector is preferably within the range of .005–.030″. Screens such as shown in Figs. 7 and 11 may be made by an electroforming process similar to that used in making phonograph records. Screen 49 is similar to screen 48.

Figure 15:
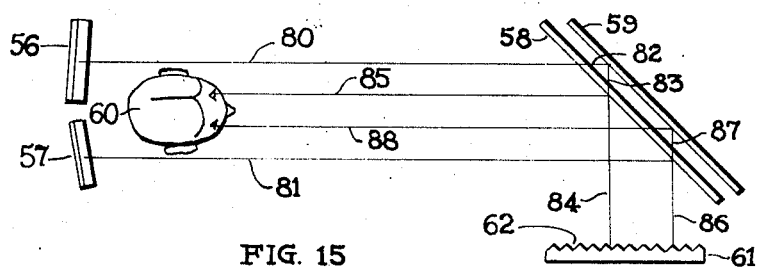
Fig. 15 is a plan view of still another optional embodiment of the invention.

Fig. 15 shows an optical system alternate to that shown in Fig. 6. In this alternate system, an image pair is supplied as before to an opaque screen (not shown). Two splitter mirrors 56, 57 at each observer position are tilted so that each reflects a separate image of the image pair to a vertically disposed pair of mirrors 58, 59 which are parallel to each other, are substantially vertical, and are turned at an angle to the line of sight of an observer 60. The mirror 58 closest to the observer is a partial mirror, manufactured as above described. The mirror 59 farthest from the observer is a totally reflecting mirror. It is obvious that such a combination of mirrors may also be obtained by coating a transparent plate with a partial reflecting coating on the side nearest the observer, and a total reflecting coating on the side of the plate farthest from the observer. Assuming an interocular spacing of 2⅝ inches, and that the mirrors are turned at an angle of 45° to the observer's line of sight, the spacing between the partial reflecting surface and the total reflecting surface will be approximately 2.625/1.414 inches, that is 1.87 inches. A retrodirective reflecting screen 61, similar to screens 48 and 49 (Fig. 6) is disposed with its reflecting surface 62 facing the partial mirror 58.

Figure 16:
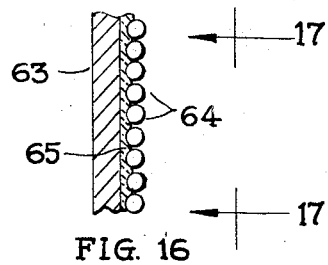
Fig. 16 shows an alternate form of screen which may be used in place of the screens shown in Figs. 6 and 15.

Fig. 16 illustrates a screen useful in the systems of Figs. 6 and 15. In this screen, an opaque sheet 63 or screen surface is substantially covered with a number of transparent glass spheres 64. The space between the sheet and the spheres is filled with a reflecting substance 65, such as silver or aluminum so that each sphere is covered on its side next to the screen with a reflective coating. This type of screen may be substituted for screens 48 and 49 in Fig. 6, and for screen 61 in Fig. 15.

The operation of the optical system of Fig. 1 will now be described. When the projector 11 is operated, it projects a right eye image 30 onto an upper area of opaque screen 12, and a left eye image 31 onto a lower and separate area of the opaque screen. In this example, the images are projected one above the other, although there is no particular advantage in this relative arrangement over any other, and they could as well be side by side, or otherwise disposed. The opaque screen could also be placed on the ceiling if desired. The images on the opaque screen are not intended to be seen directly by the observers, since no stereoscopic effect would then result.

Ray line 62 represents a ray from the left eye image 31 and ray line 63 a similar ray from the right eye image 30. The splitter mirrors 21, 22 are each intended to reflect an individual one of the images 30, 31 to the retrodirective reflecting screen 13. Therefore each of the splitter mirrors will be tilted at a different angle relative to the horizontal, and the images will be reflected to the same level on the retrodirective reflecting screen, where they overlap.

The images from the splitter mirrors "fan out" toward the retrodirective screen 13, where these rays are retro-reflected to the observer 20. It will be noted that the splitter mirrors are about level with the eyes of the observer, so that his eyes are at what may be denoted as a pseudo-focus of the system. The term pseudo-focus as used herein refers to the formation of images by comparatively large bundles of light, said bundles being controlled in direction by deviations from a plurality of planar surface reflecting and refracting elements, in contrast to the usual image formation by curved single elements.

In a system for projecting an image to be seen by an observer, there would be no useful purpose in simply returning a ray to its source. Therefore in the systems of Figs. 1 and 14, the declivities in the screens do not have mutually perpendicular reflecting surfaces. The emergent rays will always leave these reflectors so as to make an angle with the incident beam which is called the deviation. This deviation is always the same for a given three fixed intersecting reflecting surfaces, regardless of the angle of incidence of the light ray upon the reflector. The size of the angle of deviation is determined by the dihedral angles between the reflecting surfaces. The angle between surfaces 15 and 16 is determined by the distance the image is to be shifted. That is, the horizontal separation desired between the ray at the splitter mirror and the ray at the observer's eye. The term retrodirective reflector has been used herein to denote both those reflectors which return rays parallel to the incident ray (as in a true cube corner), and those which return rays with a constant angle of deviation between the incident and reflected ray, regardless of the angle of incidence.

With the retrodirective reflectors disposed as in screen 13, a ray incident to any retrodirective reflector 14 in screen 13 will be reflected therefrom with the same angle of elevation as the incident ray, and with a discreet, constant deviation in azimuth from the incident ray.

In this manner, the images will be reflected to the observer rather than back to the splitter mirrors. Fig. 5 shows the side view wherein rays 64 and 65 are the incident and reflected right eye rays to and from the retrodirective reflecting screen, and rays 66, 67 are the incident and reflected left eye rays. They all have the same elevation, while 64, 65 and 66, 67 have an angle of deviation between them.

Fig. 3 illustrates the divergence in azimuth of the emergent beams from the incident beams. Actually, since a ray is not a single, theoretical line, but rather a "bundle" having a finite area, there will be two emergent beams, one on each side of the incident bundle. Since this invention is concerned with the viewing of only one beam for each image of the image pair, the extra emergent ray is neither shown nor further discussed.

It will thus be appreciated that an image projected on the opaque screen is reflected from the splitter mirrors to the retrodirective reflecting screen, and from there back to a pseudo focus at the observer. Although the images overlap on the retrodirective screen, each single image proceeds to its proper eye. The image pair is therefore seen with a stereoscopic effect.

The optional splitter mirrors 23, 24 shown in Fig. 5 have two intersecting mirrors making a dihedral angle with each other. This optional type of mirror has the merit of requiring less adjustment than the simple plane mirrors. The latter plane type must be carefully aligned about three axes in order to reflect the beam properly to the screen. However, with a dihedral mirror, an incident light ray emerges with an angular deviation equal to twice the number of degrees by which the dihedral angle differs from 90°, regardless of the incident angle. Therefore, the only part of the optional mirror which must be aligned is the dihedral edge with respect to a line drawn between the observer's eyes. The right hand dihedral angle C is equal to 90° plus one half of the angle between ray 63 and ray 64, and the left hand dihedral angle D is equal to 90° plus one half of the angle between ray 62 and ray 66. These dihedral type splitter mirrors 23 and 24 may be directly substituted for mirrors 21, 22 in Fig. 1.

Fig. 14 shows an optional arrangement of the components of Fig. 1 wherein an opaque screen 32 corresponding to screen 12 of Fig. 1 is placed beneath the floor of the theater. The splitter mirrors 34, 35 reflect the separate images to a retrodirective screen 40. The difference between this embodiment and the system of Fig. 1 is that the opaque screen is located below the observer rather than above and ahead of him, and that the splitter mirrors reflect the images via holes in the floor. Otherwise the system is the same, and operates in the same manner as that of Fig. 1. However, it does have the merit that, since the opaque screen is not in the same room as the audience, the light from the opaque screen which is diffused therefrom does not illuminate the room, and a theater may therefore remain darker.

In the above described embodiments of Figs. 1 and 14, the eye will perceive only the image intended for it, since the head of the observer will block out the other image. This feature allows a sidewise movement of the observer. In Fig. 3, exemplary lines 68 and 69 show limiting cases. Line 68, for example, is a beam from splitter mirror 21 which just grazes the right side of the observer's head. Line 69 strikes his head, after retroreflection, just inside the left eye. The head thus blocks out from the left eye all parts of the right eye image. Beams to the right of the observer's head can be seen only by his right eye. The same results pertain with respect to the left eye as shown by lines 70, 71, wherein beam to the left of the observer's head can be seen only by the left eye. The head thus blocks out the undesirable images and it follows that the observer may shift from side to side and still see both images with the proper eye so long as enough of each mirror remains within his line of sight via the retrodirective screen that the whole of each image may be viewed indirectly.

Fig. 6 illustrates an optional optical system according to the invention. Images are projected on an opaque screen 41 and splitter mirrors 44, 45 reflect the image ahead of the observer as before. Either previously described type of splitter mirror may be utilized. Rays 72 from the upper image and rays 73 from the lower image on the opaque screen are reflected by the two splitter mirrors toward the partial mirror 47. Rays 74, 75 comprise rays from both images, which will be seen separately horizontally at the partial mirror 47. Some rays 74, 75 initially pass through the partial mirror 47 and are lost to the system unless the optional retrodirective screen 49 is placed in their path. If screen 49 is used the rays 76 are retrodirected and again strike the partial mirror. Others of the rays 74, 75 are reflected upward by the partial mirror to screen 48. When screen 48 is in place, initially reflected rays 77 are retrodirectively reflected downward and again impinge on the partial mirror. This optical system operates when either screen 48 or 49 is used, and also when both screens are used. Part of the rays 76 and 77 will be lost to the system by transmission and reflection respectively at this final encounter with the partial mirror, the lost light passing to the left in Fig. 6. The remainder of the light, or about 50% of the light from rays 74, 75 passes downward as rays 78 from the partial mirror to strike the total mirror 50 which is disposed at an angle to the viewer. Both mirrors will be large enough so that all observers may see the complete images. Rays 78 are reflected as rays 79 to the observer 46. Rays 79 represent both right and left eye images, these having the same elevation. The horizontal separation of the two images was effected by the splitter mirrors, the images then being separately reflected to the pseudo focus by the retrodirective reflecting screen. Therefore each eye will see but a single image, each different, and a stereoscopic effect results. Since the retrodirective reflection desired in this embodiment is a true reversal of direction, the screen having cube corners for declivities shown in Figs. 11–13 may be used in this system.

The totally and partially reflecting mirrors are both disposed at an angle to a line extending from a splitter mirror through the partial mirror. As stated, the retrodirective reflecting screens may be placed either on said line, on the opposite side of the partial mirror from the splitter mirrors, or on a line extending from the totally reflecting through the partial mirrors, on the opposite side of the partial mirror from the totally reflecting mirror.

Fig. 15 shows another alternate system according to the invention which resembles that of Fig. 6. The opaque screen (not shown in this view) may be placed as in the systems of either Fig. 1 or 14.

Splitter mirrors 56, 57 of the type shown either in Fig. 1 or Fig. 5 reflect the images toward the mirrors 58, 59. Rays 80 represent the left eye image which is reflected toward the partial mirror 58, and rays 81 the right eye image, similarly reflected. First consider the path of the left image 80 which strikes the partial mirror surface 58. Part of the rays are directly reflected to screen 61 by surface 58 and will never reach the left eye. These lost rays are not shown. Some rays 82 are transmitted to the totally reflecting surface 59 where they are reflected as rays 83. Part of these rays are transmitted as rays 84 to the retrodirective screen 61, from which they are retrodirected to strike surface 58 and then proceed as ray 85 to the left eye.

The path of the right eye image 81 is substantially similar where rays 81 strike the partial mirror, reflecting as rays 86 to the screen 61 and back to pass through the partial mirror as rays 87. These reflect from the total mirror 59 through the partial mirror again, and as rays 88 pass to the right eye. Rays 80, 81, 85, 88 are always parallel at any distance, and from any standpoint.

Extra image rays which may result from successive reflections between surfaces 58 and 59 will generally be too dim to be bothersome, since they decrease in intensity by approximately 50% at each encounter with the partial mirror.

Figure 17:
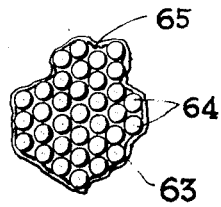
Fig. 17 is a plan view taken at line 17—17 of Fig. 16.

Figs. 16 and 17 show an optional retrodirective screen which is less expensive than the retrodirective screen shown in Fig. 11, and which may be used as a substitute therefor. A reflecting concave spherical surface has retrodirective reflecting properties similar to a cube corner and may be substituted in a screen for the optical systems of Figs. 6 and 15 with the same results, although there may be slightly more light loss when spheres are used.

In a retroreflector, the reflected ray is displaced diametrically across the apex of the declivity from the incident ray, resulting in rotation of the image in the individual declivity. The smaller the aperture, or the closer the ray strikes to the apex of the declivity, the closer is the reflected ray to the incident ray. Therefore the individual declivities are made small in size and large in number. Since each declivity reflects but a small part of the total image, a large number of small spots are rotated, rather than the image as a whole. The gross effect is a granulation of the image as seen by the observer.

This granulation is unimportant when the aperture size is about equal to the grain size of the image as projected on the retrodirective screens. For other ratios, the image will generally still appear as pleasing as most photo-engraved pictures. When more than one retrodirective screen is used as shown in Fig. 6, the resolution of the picture is improved, since the striking of the rays on the declivities is a random affair, and the rotation of small parts of images "overlaps," decreasing the granulation size and increasing the resolution of the picture.

In all of the embodiments shown above, the image pair is seen by the observer with a stereoscopic effect.

Three dimensional motion pictures and the like, which depend on two separate images, one for each eye, are commonly presented by means of two substantially superimposed images projected on an opaque screen. The images are oppositely polarized, and are singled out by fitting the observer with a pair of eye glasses, the lenses of which are oppositely polarized. Without these special glasses, the pictures blend into a bothersome and meaningless blur. Such glasses commonly incorporate a colored substance, and alter the colors of the pictures. The glasses also dim the intensity of the image. They are an additional and continuing expense, inasmuch as they cannot be used by successive persons for sanitary reasons.

By use of my present invention, two separate images from an opaque screen may be reflected to overlapping areas of retrodirective reflecting screens. Because of the special properties of the screen, the images are reflected separately to each eye so as to be viewed individually, and without fitting anything to the observer. The colors will remain true, and the image brilliant.

This invention utilizes a single luminous image pair which is sufficient for all observers in a theater. Thus the presently existing projection equipment in theaters may be used in those theaters to provide the optical system simply by relocating the opaque screen. Over a period of time, the additional retrodirective reflecting screen and the mirrors may be expected to be a recoverable cost as compared with a continuing expenditure for special devices such as glasses.

My invention is not to be limited by the embodiments described in the description and illustrated in the drawings, which are given by way of examples and not of limitation, but only in accordance with the scope of the appended claims.

I claim:

1. An optical system for projection of a stereoscopic image pair having an optical path therethrough to an observer, and components comprising, in the order encountered in the optical path, a projector, an opaque screen, a pair of splitter mirrors, and a retro-directive reflecting screen, wherein the projector illuminates the opaque screen with a stereoscopic image pair comprising two single images, said single images being projected on separate areas of the opaque screen, each splitter mirror being disposed so as to reflect a single and different image of the image pair from the opaque screen toward the retrodirective reflecting screen, where said single images overlap on said retro-directive reflecting screen, the images being retro-reflected from the retro-directive reflecting screen, whereby a different image of the image pair is perceived by each eye of the observer, each member of the pair of splitter mirrors comprising an assembly, one assembly being disposed on each side of the observer, and each assembly comprising two mirrors rigidly disposed at a dihedral angle to each other, said dihedral angle being equal to 90° plus one-half the angle through which an image must be deviated so as to be reflected to the retro-directive reflecting screen.

2. An optical system for projection of a stereoscopic image pair having an optical path therethrough to an observer, and components comprising, in the order encountered by the optical path: a projector, an opaque screen, a pair of splitter mirrors, and a retro-directive reflecting screen comprising a body having a reflective surface, said reflective surface being studded with a plurality of declivities, said declivities having three reflective sides, two sides of which are perendicular to a third reflective side, said two sides being non-perpendicular to each other, wherein the projector illuminates the opaque screen with a stereoscopic image pair comprising two single images, said single images being projected on separate areas of the opaque screen, one member of said pair of mirrors being disposed on each side of an observer so as to reflect a single and different image in the pair from the opaque screen toward the retro-directive reflecting screen, where said single images overlap on said retro-directive reflecting screen, the images being reflected from the retro-directive reflecting screen whereby a different single image is perceived by each eye of the observer, each member of the pair of splitter mirrors comprising a dihedral mirror which has two reflecting surfaces which form a dihedral angle, wherein a ray incident on said members is reflected with a deviation equal to twice the angular difference between the dihedral angle and 90°.

References Cited in the file of this patent

UNITED STATES PATENTS

| | | |
|---|---|---|
| D. 47,284 | Ebeling | May 4, 1915 |
| 1,706,218 | Chretien | Mar. 19, 1929 |
| 1,883,291 | Ives | Oct. 18, 1932 |
| 1,902,440 | Gill | Mar. 21, 1933 |
| 1,998,054 | McBurney | Apr. 16, 1935 |
| 2,471,750 | Hunter | May 31, 1949 |
| 2,550,350 | Henson | Apr. 24, 1951 |
| 2,622,220 | Geer | Dec. 16, 1952 |
| 2,716,919 | Beard | Sept. 6, 1955 |

FOREIGN PATENTS

| | | |
|---|---|---|
| 389,454 | France | June 29, 1908 |
| 542,282 | France | Aug. 8, 1922 |
| 956,825 | France | Feb. 7, 1950 |